March 7, 1967  R. L. OHMAN  3,307,745
CONTROL MECHANISM FOR VOLUMETRIC MEASURING OF BITUMEN
Filed Jan. 28, 1965  6 Sheets-Sheet 2

INVENTOR
RALPH L. OHMAN
BY
Hill, Sherman, Meroni, Gross & Simpson
ATTORNEYS

March 7, 1967 R. L. OHMAN 3,307,745
CONTROL MECHANISM FOR VOLUMETRIC MEASURING OF BITUMEN
Filed Jan. 28, 1965 6 Sheets-Sheet 4
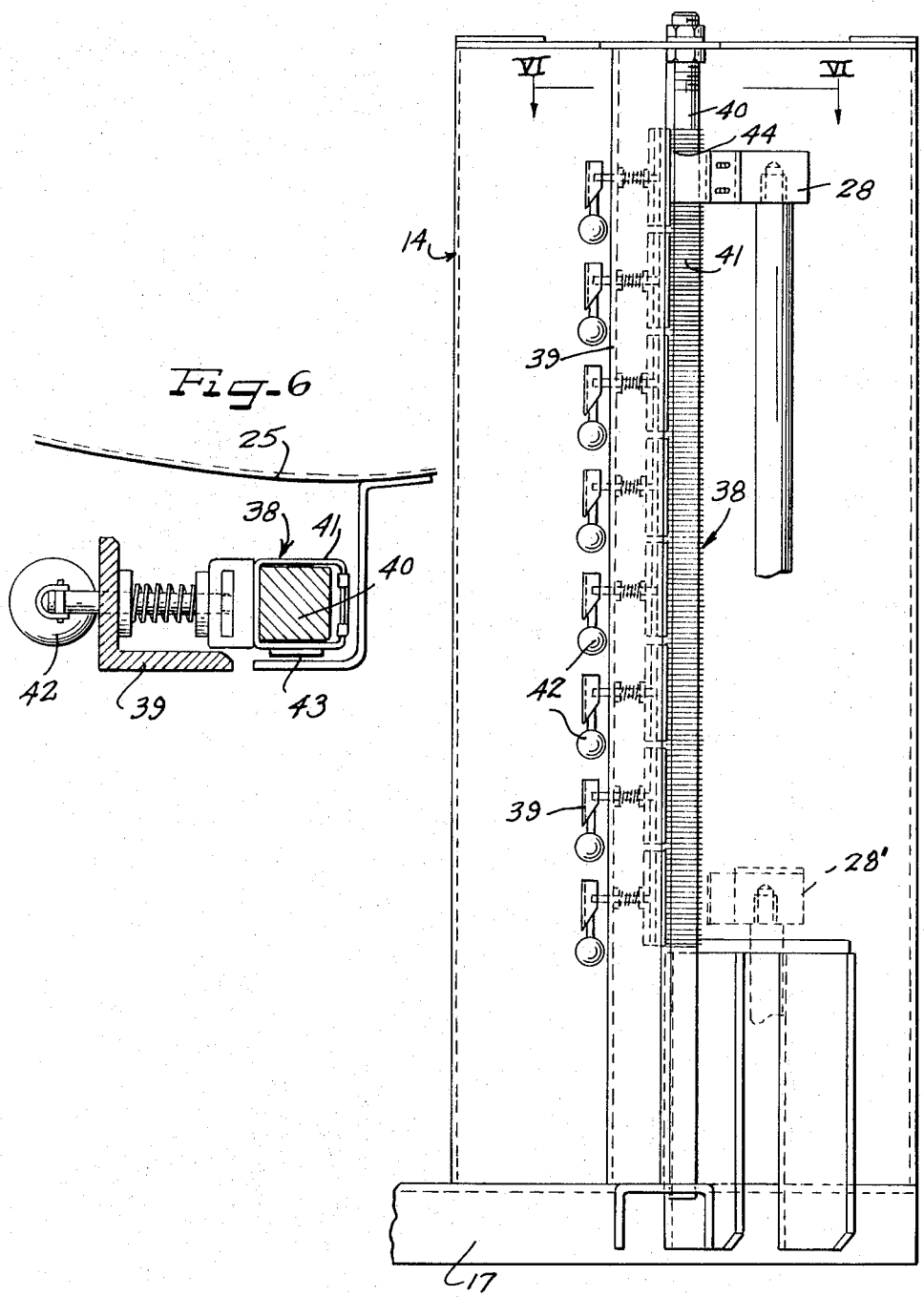
INVENTOR
RALPH L. OHMAN
BY
Hill, Sherman, Meroni, Gross & Simpson
ATTORNEYS

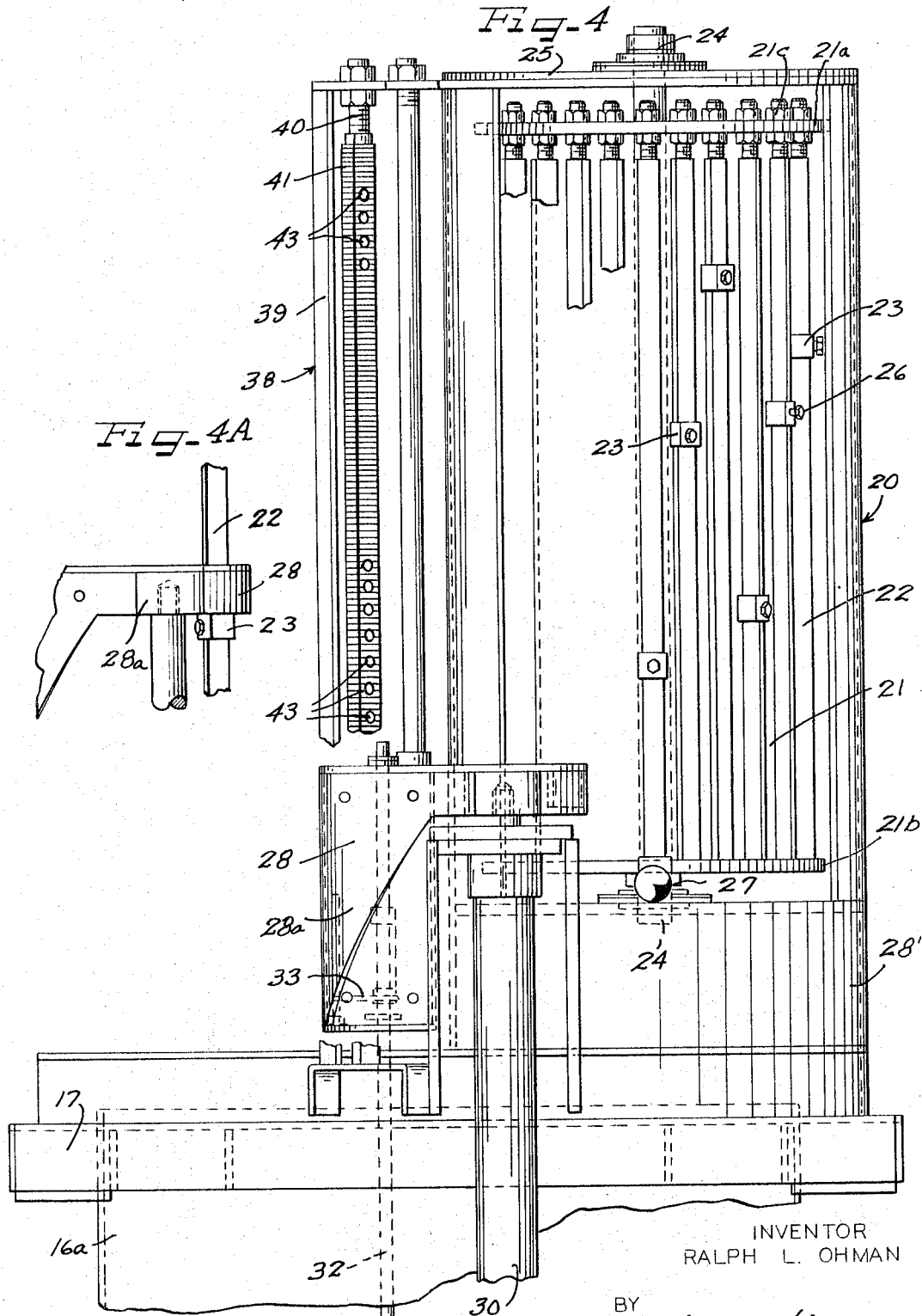

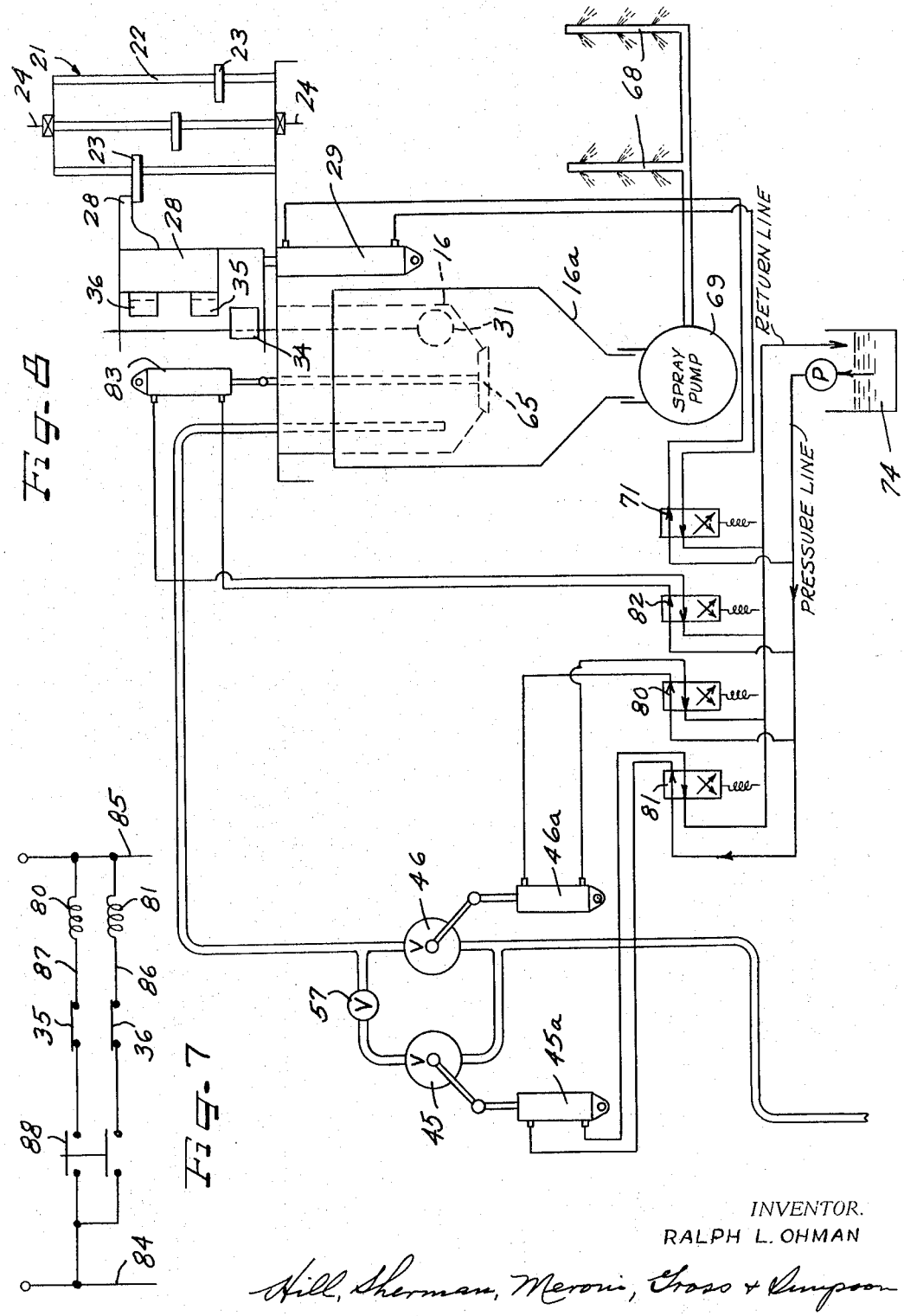

__United States Patent Office__

3,307,745
Patented Mar. 7, 1967

3,307,745
CONTROL MECHANISM FOR VOLUMETRIC MEASURING OF BITUMEN
Ralph L. Ohman, North Aurora, Ill., assignor to Barber-Greene Company, Aurora, Ill., a corporation of Illinois
Filed Jan. 28, 1965, Ser. No. 428,727
15 Claims. (Cl. 222—43)

The present invention relates generally to an apparatus for volumetric measuring of a fluid material such as bitumen. More particularly, the present invention relates to a new and improved pre-setting device for an asphalt weigh tank.

The instant invention provides an asphalt weigh tank pre-setting device which can be used with my weigh hopper pre-setting device that is the subject of my companion co-pending disclosure, Serial No. 428,764, filed January 28, 1965.

The instant device, when used singly or in combination with my co-pending disclosure, and when properly calibrated, enables an operator to make quick changeovers so that compatible quantities of liquid asphalt and aggregate can be loaded into a pug mill for producing a correctly proportioned batch or mixture.

Presently, because of governing bodies such as individual state highway departments and the like, a scale dial, indicating measurement of asphalt liquid by weight is required as part of normal asphalt system design. Other facilities are available which provide for volumetric measurement or control of liquid bodies, one of the most common being the liquid meter. However, liquid meters as used with asphalt are somewhat vulnerable to frequent breakdown because of the nature of the material being handled. High temperatures and contaminating elements which are often abrasive make this material difficult to handle. Further, electrical controls (counting and indicating devices) are used with meters have many limitations as to the amount of liquid that can be handled in specific units of time. In view of the foregoing, it will be appreciated that asphalt plants having greater requirements for output capacity have been somewhat limited and a primary purpose of this invention is to provide an apparatus that is a distinct improvement over the prior art devices now used.

The pre-setting device concerned with in this patent disclosure provides a volumetric measuring system with complete mechanical control without the aformentioned limitations.

An important object of this invention is to provide a new and improved apparatus for controlling fluid or bitumen flow to a weigh tank in various volumes.

Still another important object of this invention is to provide a new and improved apparatus for accurately controlling the bitumen content of the weigh tank, which apparatus can be more readily coordinated with an aggregate weigh hopper pre-setting apparatus or device to produce correctly proportioned mixes or batches in a pug mill.

Yet another object of this invention is to provide a bitumen or fluid volume control system for a weigh tank which can be quickly changed over to enable variable volumes to be supplied to a plug mill within a minimum period of time and with a minimum amount of effort on the part of the operator.

According to important features of this invention, I have provided an apparatus for volumetric measuring of fluid. This apparatus includes a tank, a vertically extending drum or member is mounted on the tank and in the illustrated embodiment the drum is supported on bearings and is rotatable relative to the tank. Upright bars of members are angularly arranged around the drum and each bar is provided with an adjustable stop that can be mounted in variable selectable positions on the members for varying the volume of fluid to be supplied to the tank. A carriage is mounted on the tank for vertical movement at one side of the drum and is cooperable with any one of the stops depending on the position of the drum with respect to the tank. Means are provided for locking the drum and the tank in fixed relation upon aligning the carriage with one of the stop blocks. An asphalt or fluid supply system is provided for the weigh tank and this system has valves for varying the rate of fluid flow to the weigh tank and for shutting off the flow when the fluid in the tank reaches a pre-set level determined by the position of the stop.

According to certain other features of this invention, control means are provided on the carriage including first and second controls and a volume control is provided in the tank here illustrated as a float and this float is in operative association with the first control for reducing the rate of fluid flow to the tank and cooperable with the second control for shutting off the fluid being supplied to the tank when the desired fluid volume has been transmitted to the weigh tank.

According to still other features, the aforesaid apparatus is provided with means for moving the carriage into operative engagement with any of the stops provided on the rotatable drum to vary the position of the control means on the carriage so that variable selected volumes can be supplied to the weigh tank, as desired by an operator.

Other objects and features of this invention will more fully become apparent in view of the following detailed description taken in conjunction with the accompanying drawings illustrating a single embodiment and in which:

FIGURE 4 is an enlarged fragmentary opposite side view of the device illustrated in FIGURE 3;

FIGURE 4A is an enlarged fragmentary cross-sectional view of the carriage engaged in position on a drum stop block;

FIGURE 5 is an enlarged fragmentary view of the device shown in FIGURES 3 and 4 more clearly illustrating the calibration scale;

FIGURE 6 is an enlarged fragmentary cross-sectional view taken on the line VI—VI looking in the direction indicated by the arrows as shown in FIGURE 5;

FIGURE 7 is an electrical wiring diagram illustrating the connections to certain of the electrical control components; and FIGURE 8 is a schematic hydraulic piping diagram somewhat similar to FIGURE 2, but illustrating the hydraulic and electrical components in greater detail than in FIGURE 2.

As shown on the drawings:

Figure 1:
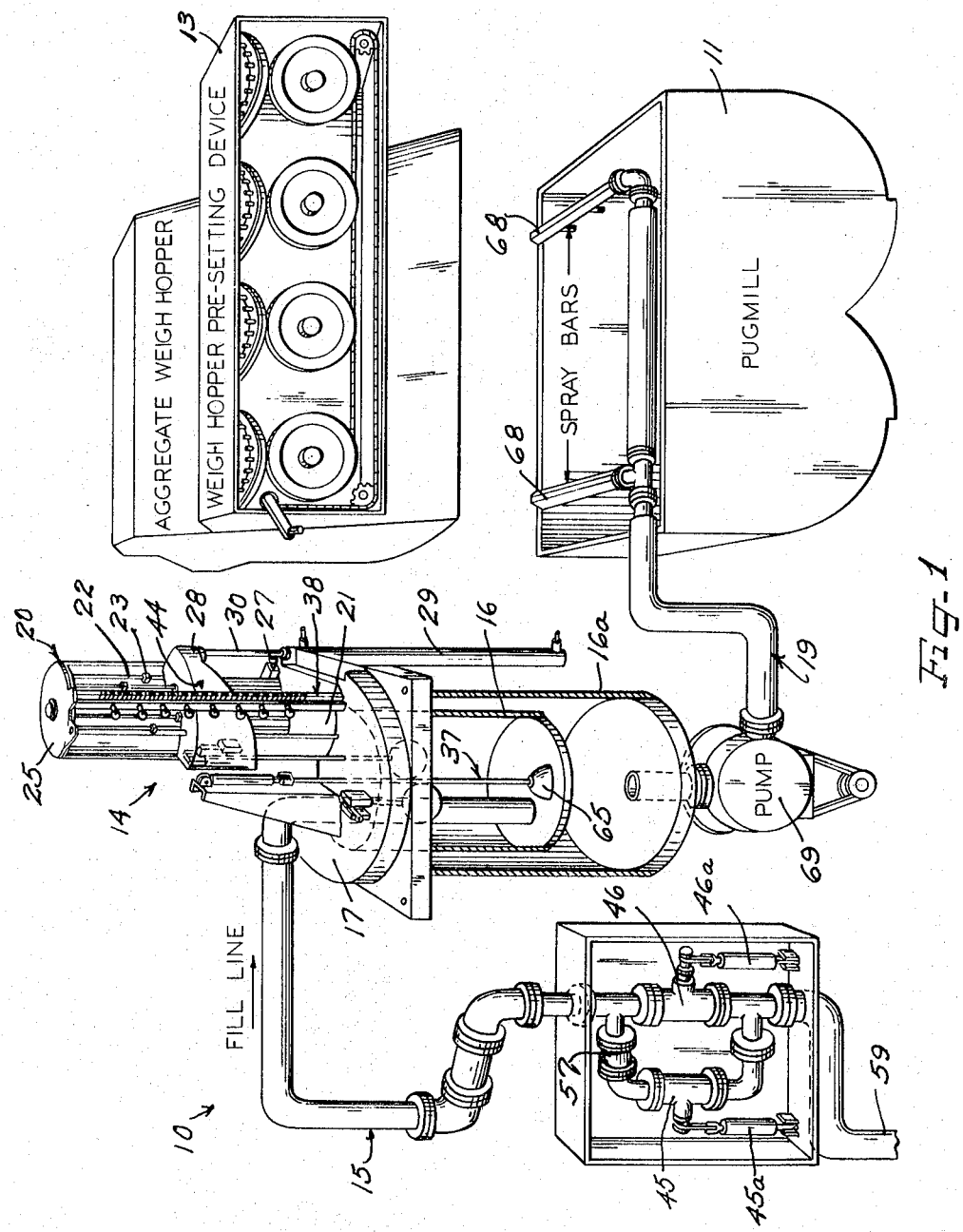
FIGURE 1 is a schematic view of a selected portion of a batch plant illustrating asphalt weigh tank and aggregate weigh hopper pre-setting devices according to important features of this invention.
Figure 2:
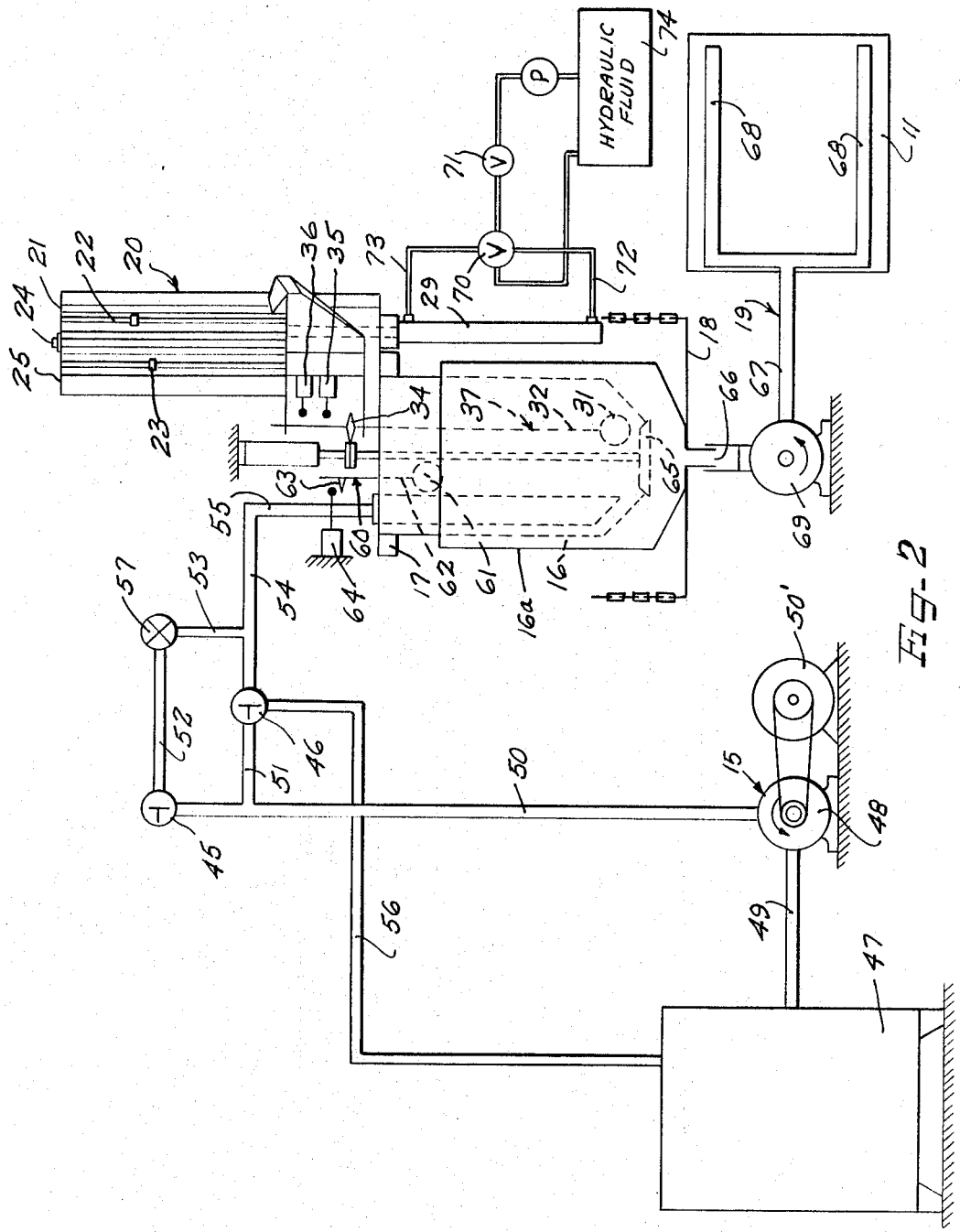
FIGURE 2 is a schematic hydraulic and electrical diagram illustrating the operation of my apparatus for producing variable selected volumes of fluid or bitumen in a weigh tank.
Figure 3:
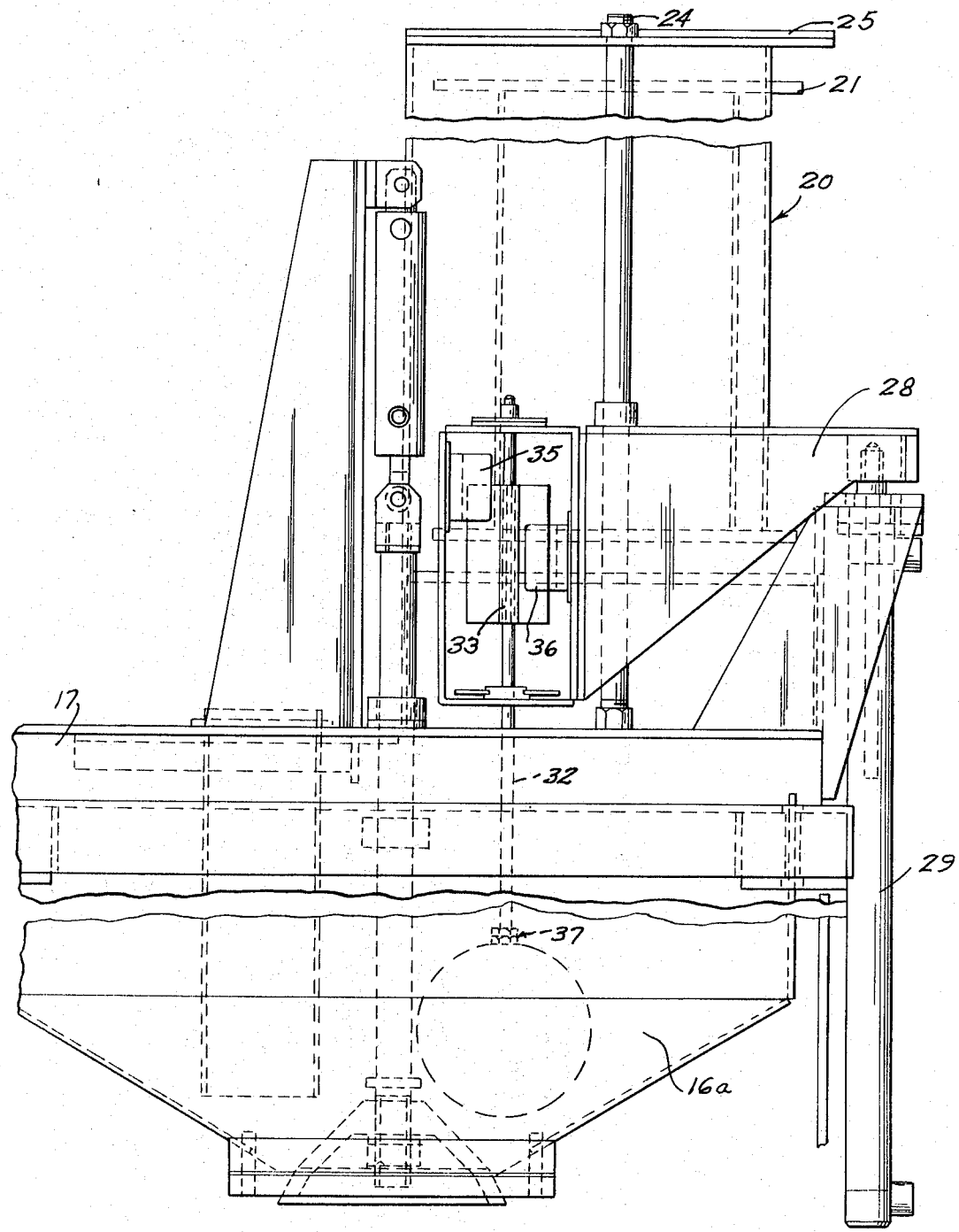
FIGURE 3 is an enlarged fragmentary side view illustrating my asphalt weigh tank pre-setting device.

The reference numeral 10 indicates generally certain components of a batch type asphalt plant which includes a pug mill 11. An aggregate weigh hopper 12 is disposed in overlying relation to the pug mill. This hopper 12 has a weigh hopper pre-setting device 13 and the operation of this device 13 is fully described in my co-pending disclosure.

According to important features of this invention, a bitumen or fluid supplying apparatus 14 is provided for coaction with other more conventional components of a batch asphalt plant. This apparatus includes a bitumen or other asphalt supply system 15 for supplying bitumen or asphalt or fluid to a tank assembly including a measuring tank 16 and a surge tank 16a. A tank cover 17 is provided at the open end of the measuring tank 16. The measuring tank is mounted on a scale which may be of any suitable type such as a dial scale, the scale being indicated at 18 in the drawings. Cooperable with the weigh tank is a spray distribution system 19 for supplying controlled predetermined volumes of asphalt or fluid with controlled predetermined volumes of aggregate to the pug mill for mixing.

According to other important features of this invention, an asphalt measuring tank pre-setting device 20 is mounted at the side of the measuring tank 16 on the surge tank 16a or on the tank assembly. This device 20 includes a drum 21 or means for supporting upright bars or members 22. A series of twenty-four (24) of the stop mounting bars 22 is secured in fixed relation at opposite ends with the drum in any suitable manner. To this end, the drum is provided with a pair of circular drum flanges 21a and 21b and an upper end of each bar is secured by fasteners 21c to the associated drum flange while the opposite end of each bar may be welded or otherwise secured to the other associated drum flange 21b.

Each stop mounting bar 22 has a stop block 23 which can be positioned and securely fixed at any desired location along the vertical axis of the stop mounting bar 22. The entire drum 21 including the bars 22 and the stops 23 is supported by bearings 24 which provide for free rotation of the drum 21 within a housing 25. Rotation of the drum 21 is required to index a given stop or stop block 23 to an operating position.

It is significant to note that the drum 21 has been provided with twenty-four (24) of the stop mounting bars 22 and the reason is to match the twenty-four (24) pre-set positions attainable with the aggregate weigh hopper presetting device that is the subject of my companion disclosure previously described.

Each stop block has means in the form of a retaining bolt 26 for securing the block in a variable selectable position on the bar 22. The drum 21 is also provided with means comprising a spring-loaded locking device 27 to maintain the rotating drum 21 in a given position once it has been properly aligned with respect to a carriage 28. It will be noted that the housing 25 has a base 28' and that the spring-loaded locking device 27 coacts with the base in holding the drum 21 in a fixed position.

A single-ended hydraulic cylinder 29 is mounted in a fixed position on the cover 17 alongside the tank 16 and which cylinder has a ram 30 joined with the carriage 28 for moving the carriage up and down in various selected positions.

FLOAT ASSEMBLY

The float assembly includes a float 31 having a float rod 32 and a float rod guide pin 33 is carried on the float rod 32. The float rod guide pin 33 coacts with a side wall 28a of the carriage for maintaining the float rod 32 in a vertical position. Also carried on the float rod 32 is a vane switch actuator 34 which coacts with magnetic reed switches 35 and 36 carried on the carriage 28 to control the supply of bitumen or fluid being transmitted to the tank 16.

The float assembly 37 is positioned at a predetermined location along the vertical axis of the complete pre-set control mechanism. This assembly including the float 31, the float rod 32, and the vane switch actuator 34 when properly positioned serves as the liquid level monitoring unit.

CALIBRATION DEVICE

The reference numeral 38 indicates a calibration device similar to the one covered by U.S. Patent No. 3,128,014. This device employs a first element 39 which is mounted in fixed relation on the housing 25 at one end and supported on the weigh tank cover 17 at an opposite end. Mounted in vertical position alongside of the first element is an upright square bar or rod 40 and a stretchable element of measurement 41 is mounted thereon. The stretchable element of measurement has convolutions and convolution securing elements 42 are provided alongside of the upright bar and supported on the first element 39 to maintain the convolutions of the spring coil in proper position due to the natural tendency of the coil to sag. By providing the square bar or rod 40 with square coils, the indicator spring 41 is prevented from spiraling. Also mounted on the stretchable element or spring 41 are a series of graduated identifying indicia 43.

By virtue of the fact that the carriage 28 is provided with a carriage reference point 44 (FIGURE 1) the operator can move the carriage 28 to any pre-determined position with respect to the graduated identifying indicia 43 and maintain the carriage in such position while the weigh tank 16 is being filled so that when the float rod 32 is elevated, the vane switch actuator 34 can operate the switches 35 and 36 for controlling the further flow of fluid to the tank 16.

The calibration device 38 can be calibrated in the manner described in the U.S. Patent 3,128,014.

FLUID CONTROL

As previously mentioned, two magnetic reed vane type limit switches 35 and 36 are provided on the carriage 28. These switches are positioned to maintain a three-inch differential for actuation. The reason for having two vane switches is to provide control of two asphalt fill valves including a low rate filling valve 45 and a high rate filling valve 46. The three-inch switch differential eliminates turbulent liquid flow and ensures accurate measuring at the final cutoff point as will be further described hereafter.

The magnetic reed switches 35 and 36 are used in lieu of rocker arm type limit switches to keep the actuation force required at a minimum. Reed switches are actuated by shunting out of a magnetic field and no physical contact or friction is required to accomplish this purpose.

OPERATION OF THE SYSTEM

As in the case of my companion disclosure, the principle of this system is to pre-set or position the physical stop 23 and allow the hydraulic cylinder 29 to cause the carriage 28 to come into physical contact with the stop. In this case, the held position represents a vertical distance.

The purpose of the float assembly 37, used in conjunction with the cutoff switches 35 and 36 as described, is to determine by volume, the amount of liquid asphalt to be placed in the measuring tank 16. The source of asphalt supply is located on the ground and in this instance is identified as a fluid reservoir 47. A pump 48 is provided adjacent to the reservoir 47 and is joined thereto by a fluid line 49. The pump is operated by a motor 50'. Connected to the filling line 49 are a series of filling lines 50, 51, 52, 53 and 54 with the line 54 terminating in a tank line 55 that projects into the tank 16. The aforesaid valves 45 and 46 are located in the fill lines with the valve 45 being disposed at the juncture of the fill lines 50 and 52 and with the valve 46 being disposed at the juncture of the fill lines 51 and 54.

Joined with the high rate filling valve 46 is a return line 56. The valves 45 and 46 in the filling lines are controlled by the switches 35 and 36 which determine whether or not the weigh tank 16 is to be filled or asphalt is to be allowed to circulate through the pumping system and bypass the weigh tank 16. Also provided in the pressure or fill lines 52 and 53 is flow regulator 57 which provides a variable orifice for regulating flow to the tank 16.

Should the fluid level in the tank 16 become excessive, means are provided as indicated at 60 for shutting down the pump motor 50′. This means includes a float 61, a float rod 62, a switch actuator 63, which float is allowed to move up and down in accordance with the level of the liquid in the tank 16. Mounted in adjacency to the float rod 62 is an overflow safety cutoff switch 64 which is actuatable by the float actuator 63 in the manner previously described.

Mounted internally of the tank 16 is an asphalt tank dump valve 65 which may be held in a closed position while the tank 16 is filled with a desired volume of fluid or asphalt and which can be lowered to allow the contents of the tank to be dispensed through tank unloading fluid lines 66 and 67 and through a pair of spray bars 68 into the pug mill 11. A pump 69 is provided for pumping out the weigh tank 16 and to cause the asphalt to be dispensed through the spray bars at a desired pressure.

PRE-SETTING PROCEDURE

Indicated below is an example of the procedure to be followed in establishing pre-set positions of liquid level cut-off points.

*Step I.*—With the asphalt tank dump valve 65 closed and filling valves 45 and 46 in their normal circulating position, the asphalt transfer pump 48 and the asphalt spray pump 49 are allowed to run.

*Step II.*—The pre-set drum 21 and the stop bar 22 are rotated manually to position #1. Also, the hydraulic ram 30 operating the vane control means comprising the vane switches carried on the carriage 28 are lowered to the minimum operating position as the ram is retracted into the cylinder. Control of this mechanism is accomplished by the use of a solenoid operated control valve 70. The speed of the hydraulic ram is controlled by a hydraulic flow control valve 71. These valves are joined to opposite sides or ends of the cylinder by means of fluid lines 72 and 73. The valves are connected at an opposite end to a hydraulic fluid source 74. After the drum has been properly indexed, the spring-loaded locking device 24 holds the drum in a fixed position.

*Step III.*—The filling valves 45 and 46 are actuated to their fill tank positions and asphalt is allowed to flow into the measuring tank 16. As asphalt liquid comes into contact with the float assembly 37, the float 31 is caused to rise. The vane switch actuator 34 rises with the float 31 and it passes through a rectangular slot in the lower vane switch 35 causing the switch to be actuated and thereby allowing fill valve 46 to close. As this occurs, asphalt liquid (bitumen) is allowed to flow at a reduced rate through the fill valve 45 while at the same time the remainder of the asphalt is caused to bypass the valve 46 and to flow through the return line 56 to the reservoir 47. Liquid flow or filling of the measuring tank 16 continues until the float assembly 37 rises to a position where the switch actuator 34 passes through the second vane switch 36 which causes the fill valve 46 to close. Filling of the measuring tank for this minimum volume position is now complete and bitumen is completely bypassing the measuring tank through the closed fluid lines.

In the preceding description it will be appreciated that the valves 45 and 46 are actuated by hydraulic cylinders 45a and 46a. These cylinders are controlled through conventional solenoid operated valves (not shown) which valves 45 and 46 are in turn operatively connected with the switches 36 and 35, respectively.

*Step IV.*—The asphalt liquid weight for this minimum volume position is now indicated on the measuring tank weighing scale 18. The stretchable element of measure 41 having the numbered coils 43 that represent weights of liquid in the measuring tank 16 is positioned so that the weight as shown on the dial scale is also at the read-out point 44 on the switch carriage 28. The minimum volume or weight has now been properly calibrated on the calibration device 38.

*Step V.*—The hydraulic ram 30 is allowed to extend thereby raising the limit switch carriage 28 several inches. Steps III–IV are repeated and the second liquid weight will be then calibrated in the same manner. This procedure is followed in increments of several inches until the hydraulic ram 30 has been extended through its full stroke. When this procedure has been completed, the asphalt weigh tank 16 and the spring indicator 41 will then be calibrated for the liquid being used.

*Step VI.*—Once this system is calibrated, pre-set stop positions are readily accomplished. As an example, if it is desired to transmit 100 pounds liquid weight of asphalt into the tank 16, the hydraulic ram 30 is allowed to move the carriage 28 until the reading point 44 is aligned with the coil indicating 100 pounds on the spring indicator or stretchable element 41. The stop block 23 on the associated mounting bar 22 is moved to an underside of a carriage finger 28a which is part of the carriage assembly 28. The stop block 23 is then locked in position by operation of the retaining bolt or fastener 26 and any time the hydraulic ram moves the carriage into contact with this stop block, the 100 pound weight will be measured or weighed into the weigh tank 16.

In order to establish other pre-set weights, a simple procedure is followed. The hydraulic ram 30 is allowed to extend to its maximum extended position. The spring-loaded locking device device 27 is released and the drum 21 is allowed to rotate to any desired numbered position. After the spring-loaded locking device 27 is engaged, the hydraulic ram 30 is allowed to lower until the required weight is read out at the spring indicator or stretchable element 41. Again the stop block 23 corresponding to the particular drum position is located under the finger 28a of the carriage 28. When the stop block 23 is locked in position with its retaining bolt 26, a new pre-set position has been established.

FIGURE 7 is a schematic of the asphalt system illustrating the electrical operation in further detail. The operation of a series of solenoid operated valves including the previously described valve 71 and the newly described valves 80, 81 and 82 along with the operation of a ram 83 will now be described in connection with FIGURE 7. In FIGURE 7, all the moving components are shown in an at rest position. The arrows on the pressure and return lines show the direction of oil flow. Also, the arrows shown in the hydraulic valves previously mentioned, represent the position of the valve spools.

Electrical signals are given simultaneously to the hydraulic solenoid valves 80 and 81 whereby the associated valve spools move upwards on the diagram reversing the pressure lines to the hydraulic cylinders 45a and 46a. This action causes the asphalt transfer valves 45 and 46 to index open. The asphalt liquid is then allowed to fill the asphalt measuring tank 16. As liquid comes into contact with float 31, the float rises with the liquid, causing the vane switch actuator 34 to pass through the switch 35. The closed switch contacts on switch 35 open to break the electric circuit to the solenoid of the hydraulic valve 80 causing the asphalt valve 46 to close. The asphalt continues to flow through the asphalt valve 45 until the liquid level in the asphalt tank causes the vane switch actuator 34 to pass through the switch 36. The closed switch contacts on the switch 36 open to break the electric circuit to a solenoid of the hydraulic valve 81 causing the asphalt valve 45 to close. The measuring tank 16 is now full to the desired level. An electrical impulse is sent to the solenoid of the hydraulic valve 82 causing the valve spool on the valve 82 to move upward on the drawing. The pressure is reversed in the hydraulic cylinder 83 causing the tank dump valve 65 to open so the tank 16 can empty. The operation of the cylinder 29 and the hydraulic solenoid valve 71 is similar and was previously described.

Also shown on FIGURE 7 is an electrical schematic. The diagram illustrates a first electrical line 84 and a second electrical ground line 85. The electrical lines 84 and 85 are joined together by means of connecting lines 86 and 87 which are in turn controlled by control switch 88 for filling the asphalt tank. As illustrated, the switch 88 is shown open and when it is closed, it completes a circuit that energizes the solenoids 80 and 81. The intermediate switches 85 and 86 are the vane float switches and they are shown in a closed position. When the vane actuator 34 passes through the switches 35 and 36 they open and the solenoids 80 and 81 are de-energized.

Although minor modifications might be suggested by those versed in the art, it should be understood that I wish to embody within the scope of the patent warranted hereon, all such modifications as reasonably and properly come within the scope of my contribution to the art.

I claim as my invention:

1. An apparatus for volumetric measuring of fluid comprising
   a tank,
   a vertically extending drum, said drum and tank being rotatably movable relative to one another,
   upright members annularly arranged about the drum, adjustable stops mountable in variable selectable positions along said upright members for determining the volume of fluid to be supplied to said tank,
   a carriage guided for vertical movement at one side of the drum and cooperable with any one of said stops depending on the position of the drum with respect to the tank,
   means for locking the drum and the tank in fixed relation upon aligning said carriage with a selected one of said stops,
   a system for supplying fluid to said tank,
   valve means provided for said system for varying the rate of fluid flow to said tank and for shutting off said flow to said tank,
   control means mounted on said carriage including first and second controls,
   a float type level control in said tank in operative association with said first control for reducing the rate of fluid flow to said tank and cooperable with said second control for shutting off the fluid being supplied to the tank upon engagement of the level control,
   guide means for maintaining the float type level in alignment with said first and second controls, and
   means for moving the carriage into operative engagement with any one of the stops provided on the rotatable drum to vary the position of said control means for controlling the flow of fluid to the tank.

2. In combination,
   a tank,
   a vertically extending drum, said drum being adjustably movable relative to said tank,
   upright members arranged along the drum, adjustable stops mountable in variable selectable positions on the members for determining the volume of fluid to be supplied to said tank,
   a carriage guided for vertical movement at one side of the drum and cooperable with any one of said stops depending on the position of the drum with respect to the tank,
   means for locking the drum in a fixed position upon aligning said carriage with a selected one of said stop blocks,
   a system for supplying fluid to said tank,
   control means mounted on said carriage,
   a level control in said tank in operative association with said control means for shutting off the fluid being supplied to the tank upon engagement of the level control with said control means,
   a safety control for shutting down the apparatus to discontinue fluid flow to said tank actuated upon the fluid reaching an above normal level, and
   means for moving the carriage into operative engagement with any one of the stops provided on the drum to vary the position of said control means for shutting down the flow of fluid to the tank.

3. An apparatus for volumetric measuring of fluid comprising
   a tank,
   a vertically extending adjustably movable drum,
   upright members annularly arranged about the drum, adjustable stops mountable in variable selectable positions on the members for determining the volume of fluid to be supplied to said tank,
   a carriage guided for vertical movement at one side of the drum and cooperable with a selected one of said stops depending on the position of the drum with respect to the tank,
   means for locking the drum and tank in fixed relation upon aligning said carriage with a selected one of said stops including a high rate tank filling valve and a low rate tank filling valve,
   control means mounted on said carriage including spaced first and second magnetic reed type switches,
   a float in said tank,
   a rod extending above said float,
   guide means for maintaining the rod in alignment with said switches,
   a vane switch actuator carried on said rod for actuating said switches,
   the switches and the valves being in operative association enabling the fluid flow rate to be reduced when the tank fluid level reaches a first level and enabling the fluid tank flow to be shut off when the fluid reaches a second higher level in the tank, and
   means for moving the carriage into operative engagement with a selected one of the stops provided on the drum to vary the position of said control means for controlling the flow of fluid to the tank.

4. In combination,
   a tank,
   a vertically extending drum, said drum being adjustably movable relative to said tank,
   upright members mounted on and about the drum,
   a stop on each upright member,
   mounting means provided for each stop enabling the stop to be mounted in variable selectable vertical positions on the members for determining the volume of fluid to be supplied to said tank,
   a carriage guided for vertical movement at one side of the drum and cooperable with a selected one of said stops depending on the position of the drum with respect to the tank,
   means for locking the rotatable drum in a fixed position upon aligning said carriage with a selected one of said stop blocks,
   a system having switch operated valves and a fluid supply reservoir for supplying fluid to said tank,
   switch means mounted on said carriage for controlling said valves and the distribution of fluid to said tank,
   a level control in said tank in operative association with said switch means for shutting off the fluid being supplied to the tank upon engagement of the level control with said switch means, and
   means for moving the carriage into operative engagement with any one of the stops provided on the drum to vary the position of said switch means for shutting down the flow of fluid to the tank.

5. An apparatus for volumetric measuring of fluid comprising
   a tank, a vertically extending, adjustably movable, support, upright members annularly arranged about the support, adjustable stops each having means for mounting the associated stop in variable selectable positions on the associated upright member for determining the volume of fluid to be supplied to said tank, a carriage guided for vertical movement along to the support and cooperable with any one of said stops depending on the position of the support with respect to the tank, control means mounted on said carriage including spaced first and second switches, a float in said tank, a rod extending above said float for actuating said switches, guide means for maintaining the rod in alignment with said switches, the switches and the valves being in operative association enabling the fluid flow rate to be reduced when the tank fluid level reaches a first level and enabling the fluid tank flow to be shut off when the fluid reaches a second higher level in the tank, and means for moving the carriage into operative engagement with a selected one of the stops provided on the drum to vary the position of said control means for controlling the flow of fluid to the tank.

6. An apparatus for volumetric measuring of fluid comprising a tank, a carriage for vertical movement relative to said tank and with said carriage having a reference point, a system for supplying fluid to said tank, valve means provided for said system for varying the rate of fluid flow to said tank and for shutting off said flow to said tank, control means mounted on said carriage including first and second controls, a level control in said tank in operative association with said first control for reducing the rate of fluid flow to said tank and cooperable with said second control for shutting off the fluid being supplied to the tank upon engagement of the level control, a calibration device including a first element, an upright rod extending in side by side relation to the said first element, a stretchable element of measurement mounted freely on said rod and with the stretchable element having convolutions arranged along the length of said rod each representative of a given amount of fluid, a series of convolution securing elements spaced along the length of said rod and securable with said rod and supporting the convolutions at various spaced intervals along the vertical extent of said rod, said convolutions having graduated identifying indicia thereon, and means including a ram for moving the carriage vertically for aligning said reference point with a selected one of said convolutions and maintaining this alignment while the tank is filled with an amount corresponding to said indicia whereby the controls can be properly positioned and coordinated with said valve means to control the fluid flow through said valve means to deliver a desired volume of fluid to said tank.

7. An apparatus for volumetric measuring of fluid comprising a tank, a carriage for vertical movement relative to said tank and with said carriage having a reference point, a system for supplying fluid to said tank, valve means provided for said system for varying the rate of fluid flow to said tank and for shutting off said flow to said tank, control means mounted on said carriage, a level control in operative association with said tank and with said control means for shutting off the fluid being supplied to the tank upon said control means being actuated by said level control, a calibration device including a first element, an upright rod extending in side by side relation to the said first element, a stretchable element of measurement mounted freely on said rod and with the stretchable element having convolutions arranged along the length of said rod each representative of a given amount of fluid, a series of convolution securing elements spaced along the length of said rod and securable with said rod and supporting the convolutions at various spaced intervals along the vertical extent of said rod, and means including a ram for moving the carriage vertically for aligning said reference point with a selected one of said convolutions and maintaining this alignment while the tank is filled with an amount corresponding to said convolution aligned with said reference point whereby the control means can be properly positioned and coordinated with said valve means to control the fluid flow through said valve means to deliver a desired volume of fluid to said tank.

8. In combination, a circular drum mounted on a bearing at one end for use with a measuring tank, mounting plates carried by the drum and projecting radially outwardly thereof, a series of bars positioned about the perimeter of said drum and secured to said mounting plates, a series of stop blocks mounted on said bars, means for securing the stop blocks in variable selectable positions on said bars, a carriage at one side of said drum, means for moving the carriage vertically of said drum into and out of engagement with any selected stop block, and means for locking the drum in a fixed position after a selected stop block is aligned with said carriage.

9. In combination, a circular drum mounted on a bearing at one end for use with a measuring tank, a series of bars positioned about the perimeter of said drum, means securing said bars to said drum, a series of stop blocks mounted on said bars, means for securing the stop blocks in various selectable positions of adjustment on said bars, a carriage at one side of said drum, means for moving the carriage vertically of said drum and holding the carriage firmly against any selected stop block during the filling of the weigh tank, and means for locking the drum in a fixed position after a selected stop block is aligned with said carriage.

10. In combination, a circular drum mounted on a bearing at one end for use with a measuring tank, mounting plates carried by the drum and projecting radially outwardly thereof, a series of bars positioned about the perimeter of said drum and secured to said mounting plates, a series of stop blocks mounted on said bars, means for securing the stop blocks in various selectable positions of adjustment on said bars, a carriage at one side of said drum, means for moving the carriage vertically of said drum into and out of engagement with any selected stop block, and means for locking the drum in a fixed position after a selected stop block is aligned with said carriage.

11. An apparatus for volumetric measuring of fluid comprising a tank, a vertically extending upright member support, said support being adjustably movable relative to said tank, upright members annularly arranged about the upright member support, adjustable stops each having attachment means for mounting the associated stop in variable selectable positions on the associated upright member for determining the volume of fluid to be supplied to said tank, a carriage guided for vertical movement relative to said tank and upright member support and with said carriage having a reference point, a system for supplying fluid to said tank, valve means provided for said system for varying the rate of fluid flow to said tank and for shutting off said flow to said tank, control means mounted on said carriage, a level control in operative association with said tank and with said control means for shutting off the flow of fluid to said tank upon actuation of said control means by said level control, a calibration device including a first element, an upright rod extending in side by side relation to the said first element, a stretchable element of measurement mounted freely on said rod and with the stretchable element having convolutions arranged along the length of said rod each representative of a given amount of fluid, a series of convolution securing elements spaced along the length of said rod and securable with said rod and supporting the convolutions at various spaced intervals along the vertical extent of said rod, and means including a ram for moving the carriage vertically for aligning said reference point with a selected one of said convolutions and maintaining this alignment while the tank is filled with an amount corresponding to said convolution aligned with said reference point whereby the control means can be properly positioned and coordinated with said valve means to control the fluid flow through said valve means to deliver a desired volume of fluid to said tank one of the adjustable stops being movable and secured by said attachment means in underlying engagement with the carriage for supporting the carriage.

12. In a bituminous batch plant, a bitumen tank, a bitumen supply system including a motor driven means for supplying bitumen to the tank and further including a control valve, a bitumen tank pre-setting device for the volumetric measuring of bitumen associated with said tank, said device including control means for operating said control valve including a liquid monitoring unit responsive to the volume condition of the fluid in said tank and cooperable with said control means for operating said control valve when the desired volume of fluid has been delivered to said tank as determined by said pre-setting device, and an overflow means cooperable with said motor driven means for shutting down said system upon the tank being in an overflow condition.

13. In an apparatus for the volumetric measurement of bitumen for mixture with aggregate, a measuring tank, means supplying bitumen to said tank including, a pump and control valve means controlling the flow of asphalt from said pump to said tank, a movable carriage having control means thereon operable to effect actuation of said valve means, a support mounted for adjustable movement with respect to said carriage, a plurality of stops spaced along said support and mounted on said support for presettable adjustable movement with respect thereto, a selected one of said preset stops, dependent upon the position of adjustment of said support, being cooperable with said carriage to determine a quantity of bitumen to be delivered to said tank, and liquid level control means cooperating with said carriage and operable to effect actuation of said control means on said carriage to effect actuation of said valve means, to discontinue the supply of bitumen to said tank.

14. The structure of claim 13, wherein the control valve means is operable under the control of electrical energizing means, wherein the control means on said carriage comprise switch means in association with said liquid level control means and carriage and operable to effect operation of said energizing means to effect operation of said valve means to discontinue the supply of bitumen to said tank in accordance with the position of said carriage relative to said tank as determined by a preset stop.

15. The structure of claim 13, wherein the support is disposed above the tank and is mounted for rotatable adjustable movement with respect to said carriage, wherein the stops are spaced about said support, wherein the carriage is moved by power into engagement with a selected preset stop, wherein the actuating means for the control valve means is under the control of electrically energizable means, and wherein a switch energizing and deenergizing said electrical energizable means is mounted on said carriage and is actuated by said liquid level control means to close said control valve means in accordance with the relative position between said float and carriage set by a selected stop.

References Cited by the Examiner

UNITED STATES PATENTS

| 1,592,587 | 7/1926 | Wilson | 222—43 X |
| 1,774,790 | 9/1930 | Di Tella | 222—43 |
| 2,506,240 | 5/1950 | Sekkel | 222—21 |
| 3,029,833 | 4/1962 | De Frees | 141—128 X |

ROBERT B. REEVES, *Primary Examiner.*

HADD S. LANE, *Examiner.*